Dec. 2, 1958          R. F. MALLINA          2,862,670

AUTOMATIC WIRING APPARATUS

Filed July 24, 1953          10 Sheets-Sheet 1

FIG. 1

INVENTOR
R. F. MALLINA
BY
John C. Morris
ATTORNEY

Dec. 2, 1958   R. F. MALLINA   2,862,670
AUTOMATIC WIRING APPARATUS
Filed July 24, 1953   10 Sheets-Sheet 2

INVENTOR
R. F. MALLINA
BY
John C. Moore
ATTORNEY

Dec. 2, 1958

R. F. MALLINA 2,862,670

AUTOMATIC WIRING APPARATUS

Filed July 24, 1953

INVENTOR
R. F. MALLINA
BY
John C. Morris
ATTORNEY

Dec. 2, 1958  R. F. MALLINA  2,862,670
AUTOMATIC WIRING APPARATUS
Filed July 24, 1953  10 Sheets-Sheet 5

INVENTOR
R. F. MALLINA
BY John C. Morris
ATTORNEY

Dec. 2, 1958   R. F. MALLINA   2,862,670
AUTOMATIC WIRING APPARATUS
Filed July 24, 1953   10 Sheets-Sheet 6

INVENTOR
R. F. MALLINA
BY John C. Morris
ATTORNEY

Dec. 2, 1958          R. F. MALLINA          2,862,670
AUTOMATIC WIRING APPARATUS
Filed July 24, 1953                           10 Sheets-Sheet 8

FIG.15

INVENTOR
R. F. MALLINA
BY John C Morris
ATTORNEY

Dec. 2, 1958

R. F. MALLINA 2,862,670

AUTOMATIC WIRING APPARATUS

Filed July 24, 1953

INVENTOR
R. F. MALLINA
BY John C. Morris
ATTORNEY

Dec. 2, 1958  R. F. MALLINA  2,862,670
AUTOMATIC WIRING APPARATUS
Filed July 24, 1953  10 Sheets-Sheet 10

INVENTOR
R. F. MALLINA
BY
John C. Morris
ATTORNEY

United States Patent Office 2,862,670
Patented Dec. 2, 1958

2,862,670

AUTOMATIC WIRING APPARATUS

Rudolph F. Mallina, Hastings on Hudson, N. Y., assignor to Bell Telephone Laboratories, Incorporated, New York, N. Y., a corporation of New York Application July 24, 1953, Serial No. 370,147

8 Claims. (Cl. 242—7)

This invention relates to wiring systems and more particularly to a coordinated system of controlled machinery for connecting wires between terminals of a mounted array of electrical apparatus units.

The electrical interconnection of a plurality of terminals of apparatus units mounted on a rack or panel has, heretofore, required the service of an operator to cut to length, and to skin or strip the ends of insulated wires, to attach said ends to designated terminals, and to solder the wires and the terminals together at the points of attachment. Improvements have been realized by the use of wire wrapping tools, often called guns, that will rapidly wrap the skinned end of a wire around a terminal, either as a prelude to soldering or in an electrically and structurally satisfactory connection requiring no solder. A hand operated tool of this type is disclosed in Patent No. 2,585,010 of Hickman, Mallina and Reck, issued February 12, 1952. Other similar wiring tools, motor powered and hand controlled, such as that disclosed in the application of Frank Reck, Serial No. 234,643, filed June 30, 1951, now Patent No. 2,743,502, issued May 1, 1956, will cut, strip and wrap the end of a wire around a terminal into a wrapped connection requiring no solder. A tool of the latter type with modification for electrical control is suitable for use in the wiring machine of this invention.

An object of this invention is to interconnect designated terminals of a plurality of units of electrical apparatus suitably mounted on a rack, panel or like structure.

A more specific object of this invention is to carry out a complete wiring program or scheme for a mounted group of apparatus units by means of a suitably controlled machine.

A feature of this invention resides in a wiring machine, including wire wrapping tools or guns, means for moving the tools to designated positions in a coordinate system, and means for inserting the terminals in these positions into the tools for the connection of the ends of a wire to the respective terminals.

A more specific feature lies in an assemblage comprising a base on which is mounted a supporting means for apparatus panels, for wiring tools, and for wiring tool positioning means; the panel supporting means being operable to move the terminals of panel mounted apparatus units into and out of a wiring plane; the wiring tool positioning means being operable to move the wiring tools along prescribed paths to positions opposite particular terminals; and the wiring tool being operable to connect wires to selected terminals; all under the control of a code directed sensing means, the code information being stored in a suitable record.

A record of the wiring program or scheme for each of any desired number of apparatus groups may be prepared from the wiring information for each group. The wiring machine may then be employed for wiring any of the groups by inserting the proper record in the sensing means. The record may be in any suitable code and form, one of which will be subsequently described.

Other and further objects and features of this invention will appear more fully and clearly from the following description of an illustrative embodiment thereof taken in connection with the appended drawings in which.

The wiring machine of the embodiment chosen to illustrate this invention comprises generally a base on which are mounted an apparatus or panel positioning means, wiring devices or wire wrapping tool means, means including carriages and elevators for positioning the wiring devices or wrapping tool means, means for supplying wire to the tool means, means for aiding in positioning the wire, and means, including record means, for controlling the operation of these means to interconnect selected terminals of an array of terminals of mounted apparatus in accordance with a prescribed pattern or scheme.

Figure 1:
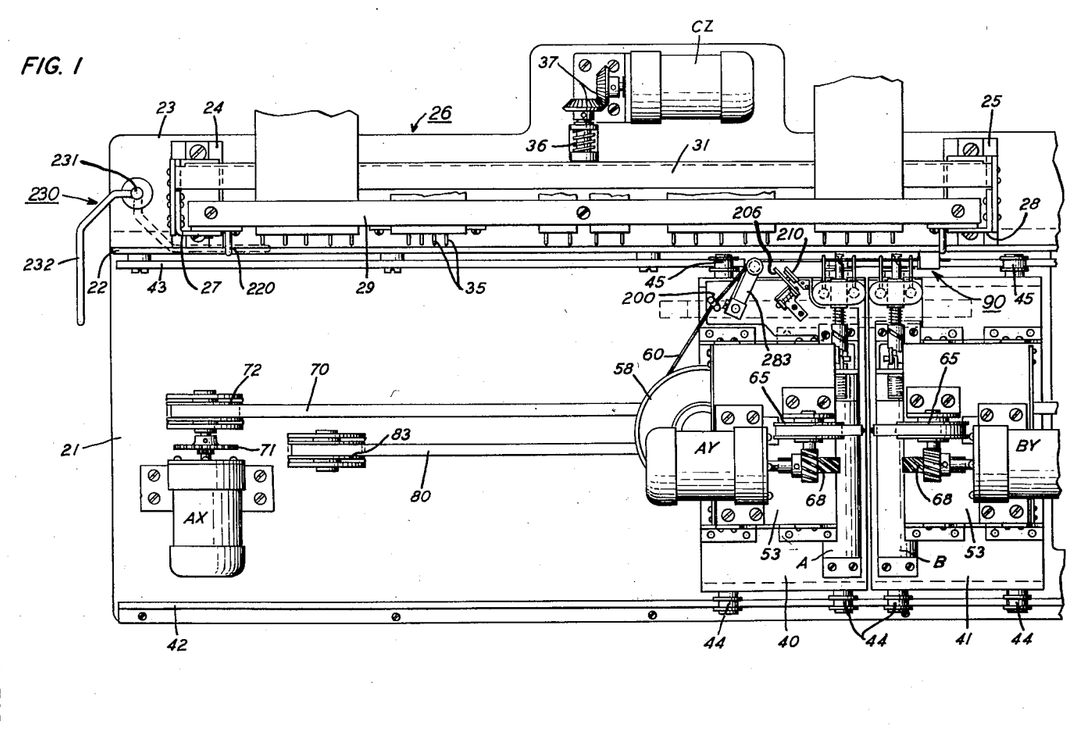
Fig. 1 is a plan view of a wiring machine comprising an illustrative embodiment of this invention.
Figure 2:
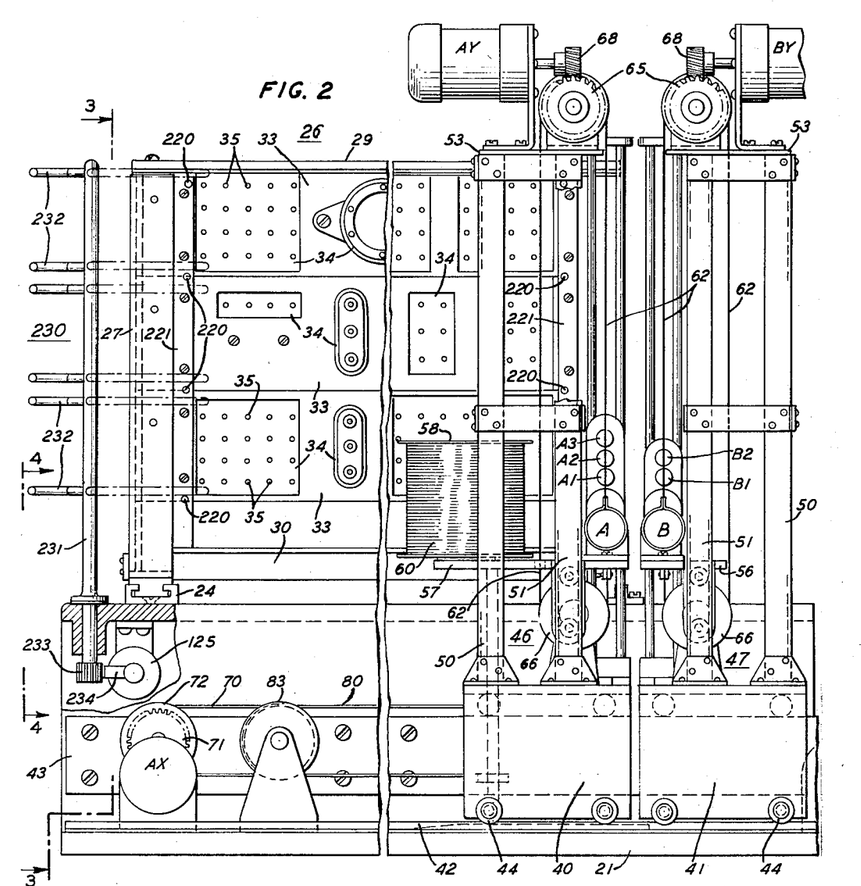
Fig. 2 is a front elevational view, with a midportion broken out and a small portion in section, of the machine shown in Fig. 1; a small fraction of the right end of the structure not essential to an understanding of the invention has been broken away in both of Figs. 1 and 2.
Figure 3:
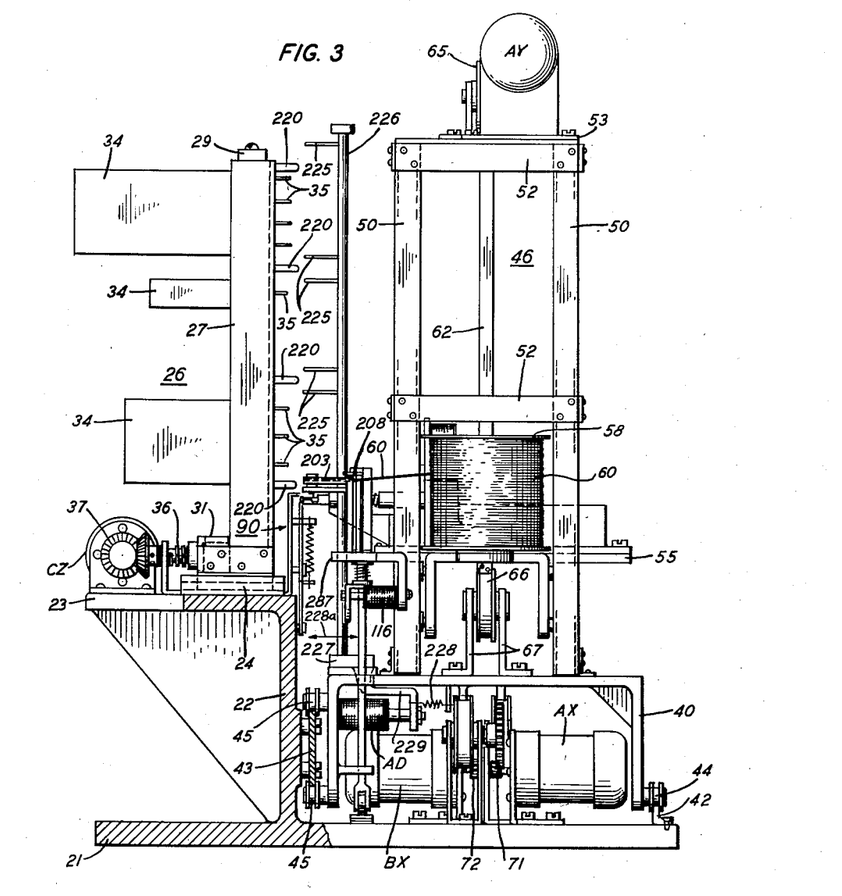
Fig. 3 is a left end elevation, partly in section, of the machine of Figs. 1 and 2; the section being taken on line 3—3 of Fig. 2.

As shown in Figs. 1, 2 and 3 with reference to other figures as required, the machine comprises a base 21 having a back wall 22 supporting a shelf 23. Tracks 24 and 25 on the shelf 23 guide and support a panel mounting frame denoted generally as 26. The frame 26, generally rectangular in configuration, comprises vertical side members 27 and 28, connected by top and bottom cross members 29 and 30 respectively.

The panel mounting frame 26, as its name implies, is for mounting a panel or panels of apparatus units to be wired. The illustrations shown in Figs. 2 and 13 disclose three panels or panel sections 33 on which are mounted various apparatus units 34. Each apparatus unit has all of its terminals 35 projecting in the same direction and advantageously the same distance from the panel. The terminals are arranged on the apparatus units and the units on the panels so that each terminal is located at a determined discrete point in a coordinate system. (The terminals 35 shown in Fig. 13 have been designated as T1 and T2 for convenience of certain phases of the description as will appear subsequently.)

In front of the wall 22 are two wiring tool carriages 40 and 41 horizontally movable along the base 21 on a base mounted track 42 and a wall mounted track 43. The carriages run on grooved rollers 44 on the track 42 and grooved rollers 45 embracing the track 43.

Projecting upwardly from each carriage 40 and 41 are elevator towers designated generally as 46 and 47. Each tower comprises a pair of angle section uprights 50 and a pair of channel section uprights 51 as shown particularly in Fig. 5. The uprights 50 and 51 are tied together with cross members 52. The towers 46 and 47 each have top plates 53 at their upper extremities.

The wiring tools A and B are mounted on elevator platforms 55 and 56 respectively. Platform 55 has a projecting portion 57 for supporting a spool 58 of wire 60 which is carried along with the wiring tool A. The platforms 55 and 56 are guided by rollers 61 mounted on depending arms 54 and running in the channels of the uprights 51. (See Figs. 5 and 10.)

The wiring tools A and B and their respective platforms are supported and moved by means of belts 62, which advantageously may be metal tape. The belts are secured to the bottoms of the respective platforms at 63 and to the tops of the respective wiring tools at 64. (See Fig. 10.) The belts 62 pass over drive pulleys 65 mounted on the top plates 53 and over driven pulleys 66 mounted on the tops of the carriages 40 and 41. Pulleys 66 may be mounted on angle brackets 67 as shown in Fig. 3.

The motors AX and BX respectively, provide motive power for horizontal movement of the carriages 40 and 41. The motors AY and BY respectively, provide motive power for the vertical movement of the wiring tools A and B. The panel support frame 26 is moved toward and from the wiring tools A and B on the tracks 24 and 25 by the panel or apparatus positioning motor CZ.

The horizontal drive motor AX is mounted on the base 21 and drives the carriage 40 by means of a belt 70 via the gearing 71 and the driving pulley 72. The carriage 41 is similarly driven by the horizontal drive motor BX by means of a belt 80 via the gearing 81 and the driving pulley 82. (See Figs. 3 and 5.) The belts 70 and 80 are connected respectively to the carriages 40 and 41 and pass over driven pulleys. The driven pulley for the belt 70 is concealed by the carriages in the various figures, but corresponds to the driven pulley 83 for the belt 80 as shown adjacent the motor AX in Figs. 1 and 2. The driven pulley for the belt 70 is adjacent the motor BX.

The vertical drive motors AY and BY are mounted respectively on the top plates 53 of the towers 46 and 47. These motors drive the respective wiring tools A and B by means of the previously described belts 62 and pulleys 65 and 66. The driving pulleys 65 are connected to their respective motors by the gearing 68.

The panel positioning motor CZ is mounted on the shelf 23 and drives the frame 26 through its cross member 31 via a worm 36 and gearing 37.

Figure 10:
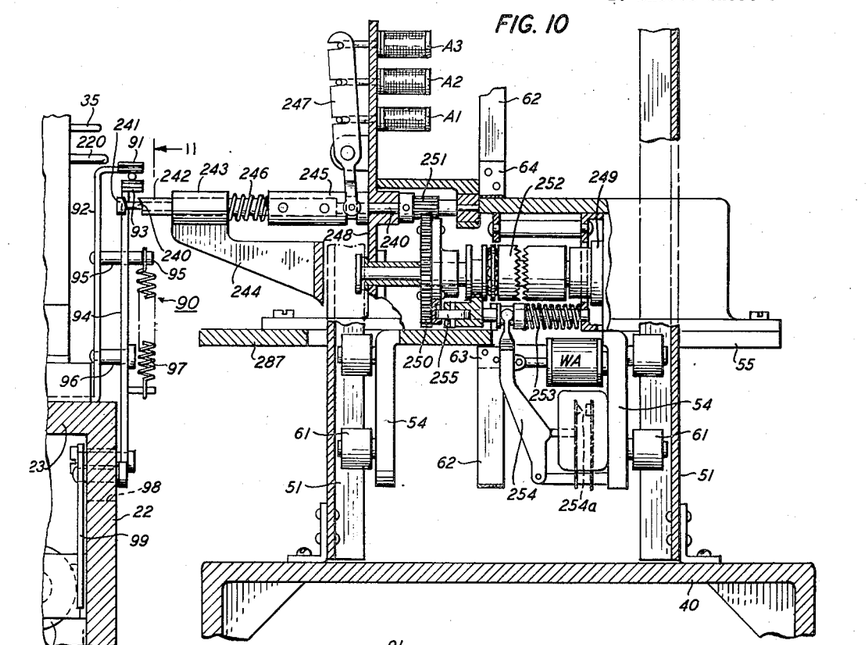
Fig. 10 is a view partially in section, of the left hand wiring tool of Figs. 1 and 2 and of its support, and of mechanisms cooperating with said tool.
Figure 11:
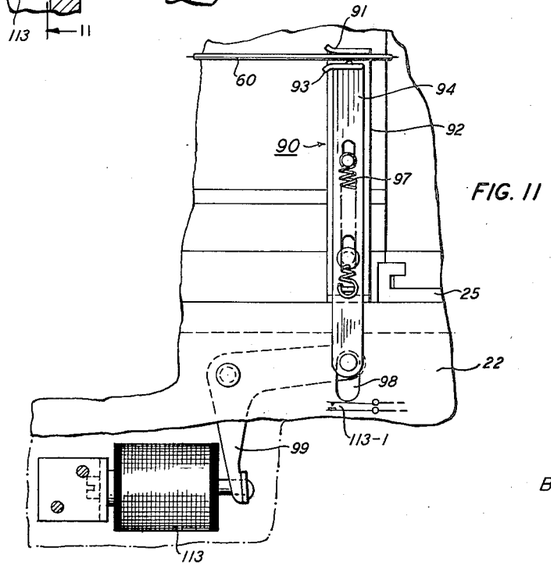
Fig. 11 is an elevational view with parts broken away of mechanisms shown in Fig. 10 taken on the line 11—11 of Fig. 10.

As has been noted, a tool of the type disclosed in Reck application, Serial No. 234,643, filed June 30, 1951, may be adapted for electrical control for use in the wiring machine herein disclosed. The wiring tool shown in Fig. 10 is of this type. No wire cutter is, however, required in this tool because the function is performed by the wire cutter 210 to be subsequently described. The tool shown in Fig. 10 is the wiring tool A which is located at the left of the tool pair.

The wire wrapping head of the wiring tool comprises a rotatable spindle 240 having an enlarged, grooved end 241 and is provided with a substantially axial terminal receiving orifice. A sleeve 242 is mounted on the spindle for rotation therewith, but axially movable with respect thereto. The end of the sleeve adjacent the enlarged spindle end 241 is grooved to cooperate with the grooved portion of 241 to form between them wire gripping jaws or a wire passage, depending upon the axial position of the sleeve.

The sleeve is journaled in an outboard bearing 243 which is supported by a bracket 244. The sleeve is axially moved by a cross head 245 in which it is free to rotate. The cross head is biased by the spring 246 to urge the jaws of the wire wrapping head to open position. A lever 247, pivotedly bracketed to the end wall 248 of the wiring tool housing, is connected at one end to the cross head 245 and is operated by a selected one of three solenoids A1, A2 and A3. The solenoid A1 moves the sleeve 242 far enough to close the jaws tightly on an inserted wire for insulation crushing. A lighter grip for insulation stripping and wire wrapping is furnished by the solenoid A2 and a closure only sufficient to guide an insulated wire by the solenoid A3.

The spindle 240 is driven from the motor 249 through the gear 250, the pinion 251 and the clutch 252. The clutch is operated to engaged position by the solenoid WA against the bias of the spring 253, through the clutch shifting means 254. The clutch shifting means 254 closes the motor control switch 254a and removes the indexing detent 255 from a depression on the face of the gear 250 when operated to engage the clutch. When the solenoid WA is de-energized, the shifting means 254 remains in operative position and the switch 254a remains closed until the detent 255 drops into its depression. The spindle is thus always stopped in the same position ready to be loaded with a wire. This indexing and controlling mechanism is disclosed in the application of Frank Reck, Serial No. 15,834, filed March 19, 1948, now Patent 2,649,121, issued August 18, 1953, as well as in the Reck application to which reference has previously been made.

Figure 15:
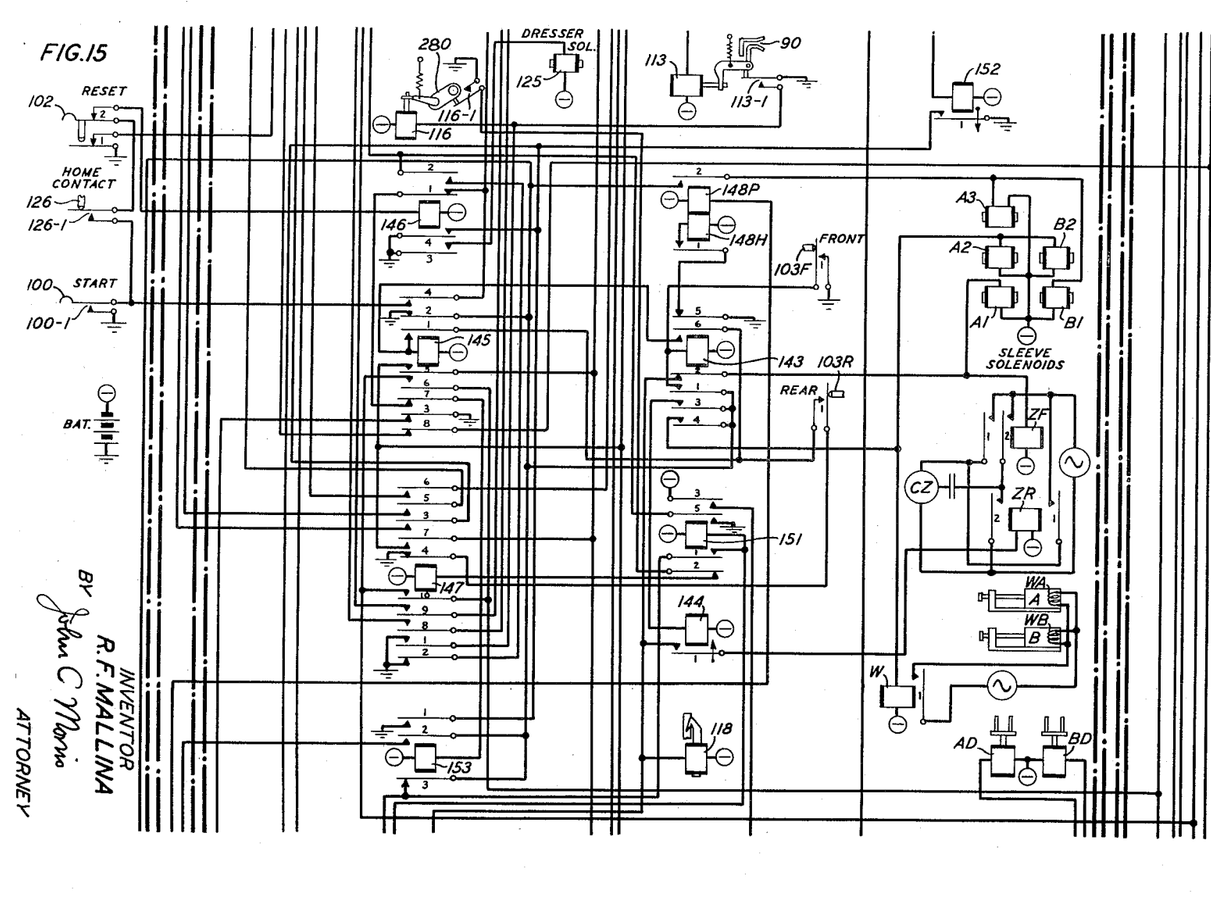

The wiring tool B is similar to the tool A but has only two sleeve controlling solenoids B1 and B2 corresponding to A1 and A2. There is no B3 solenoid on this tool since no wire guiding condition of this tool is required. The tool B has a solenoid WB similar to the solenoid WA of the tool A. Both of these solenoids are operated together from the contact W-1 of a relay W (Fig. 15 of the wiring diagram). The tools A and B also differ in being what may be called in enantiomorphic relation, i. e. right and left handed respectively. This more or less arbitrary designation refers to the directions of wiring head rotation and of wire receiving groove orientation which are opposite in the two tools. This difference is necessary because the wiring tools operate simultaneously on opposite ends of the same piece of wire.

As has been noted, a spool 58 carrying a supply of wire 60 is mounted on the projection 57 of the platform 53 of the wire tool A. In order to position the wire so that it may be loaded into the wiring tools, there is provided wire feeding, positioning, and cutting mechanism accompanying the wiring tool A, and a stationary wire gripper mechanism on the shelf 23 and the wall 22.

The stationary gripper is shown at 90 in Figs. 1, 5, 10, and 11, and is located slightly to the left of the track 25 and at a level such that the wrapping heads of the tools A and B will pass thereunder when the tools are in their lowermost position. As may be seen in detail in Figs. 10 and 11, the gripper 90 comprises a stationary jaw 91 on a bracket 92 mounted on the shelf 23, and a movable jaw 93 on a slide 94, which is guided by studs 95 and 96 projecting from the bracket 92. The movable jaw 93 is biased to closed or gripping position by the spring 97 anchored to the stud 95. The lower end of the slide 94 is secured, through a slot 98 in the wall 22, to a bell crank 99 mounted back of the wall. The bell crank 99 and thus the jaw 93, are operated by the solenoid 113 against the bias of the spring 97 to open the gripper 90.

The wire 60 is inserted in the stationary gripper 90 by movement of the carriage 40 to the right at an appropriate time, at which time an end portion of the wire is directed toward the gripper by the wire feeding and positioning mechanisms.

Figure 8:
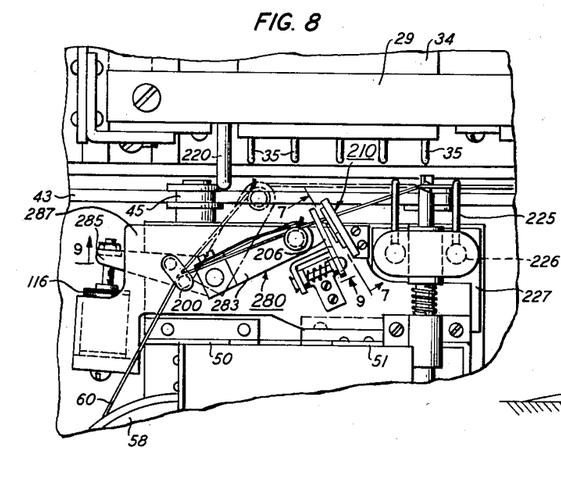
Fig. 8 is an enlarged fractional view of the wire handling means shown in Fig. 5.
Figure 9:
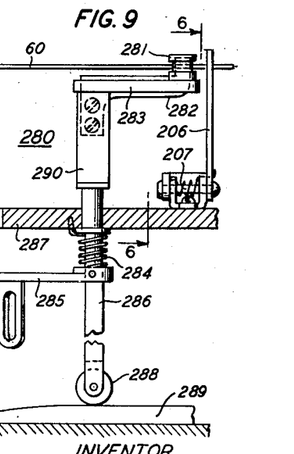
Fig. 9 is an elevational view of some of the elements of the wire handling means of Figs. 5 and 8 taken on the line 9—9 of Fig. 8.

The wire 60 is fed from the spool 58 through a guide 200 and a wire positioning and feeding means 280, including a one-way feed means which comprises the slotted member 281 and the spring 282 mounted on the swingable arm 283 (see Figs. 8 and 9). The arm 283 is biased to the full line position of Fig. 8 by the spring 284 (Fig. 9). When energized, the solenoid 116 connected to the crank arm 285 moves the arm 283 to the dot-dash position of Fig. 8 against the bias of the spring 284. The arm 283 pivots on the shaft 286 rotatable and slidable in the shelf 287, which is a part of the elevator for the tool A. The shaft 286 is provided at its lower extremity with a roller 288 which rides on the camming member 289 mounted on the base 21. The camming member 288 is of sufficient length to raise the feed member when the tool A is in either the home or the loading position. In the raised position the parts 281—282 of the feeding means 280 are on a level with the stationary gripper 90. The shaft 286 is urged toward the base 21 or the camming member 288 by the spring 284. The squared portion 290 of that part of the shaft 286 above the shelf 287 is of a length to limit the downward movement of the wire feeding means 280. The reason for this vertical movement of the feeding means will appear in the subsequent description.

When the arm 283 is in the full line position shown in Fig. 8 and raised as shown in Fig. 9, the wire 60 lies in a notch on the underside of a forming hook 206, mounted adjacent the end of the arm 283. The hook 206 is biased in the position of Figs. 6 and 8 by the spring 207 so that it may be tilted to the right (Fig. 6) against the bias when necessary. The function of this hook will appear more fully and clearly in a forthcoming description of operation.

Figures 5, 6, 7:
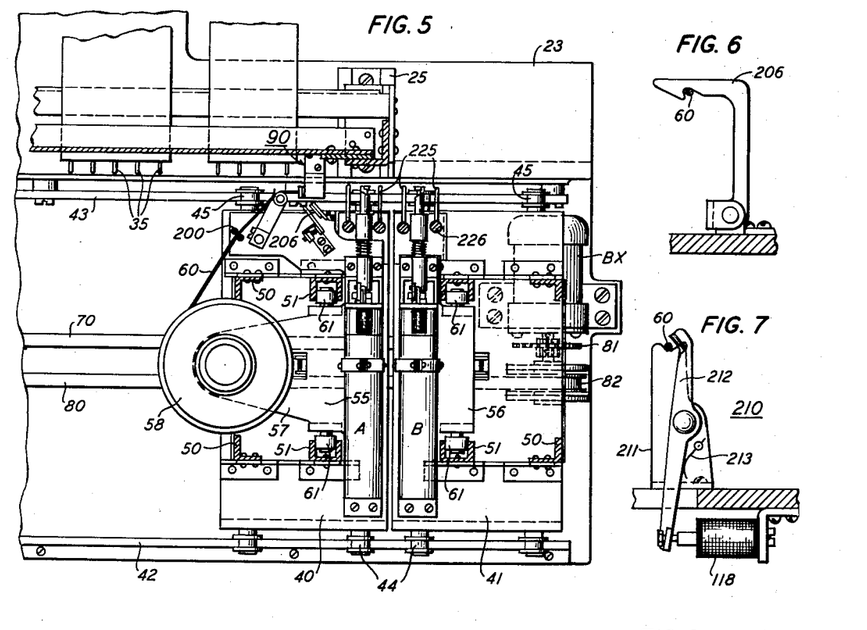
Fig. 5 is a plan view of the right end of the machine as shown in Fig. 1 with some parts removed to show the detail as to underlying parts.
Fig. 6 is an elevational view of a wire controlling means and is taken on the line 6—6 of Fig. 9.
Fig. 7 is an elevational view of a wire cutter taken on the line 7—7 of Fig. 8.

Between the hook 206 and the wrapping tip of the wire wrapping tool A is a wire cutter 210, which is shown in detail in Fig. 7. The cutter comprises a fixed member 211 and a movable member 212. The fixed member 211 has a notch at its top for receiving the wire 60. The movable member 212 is pivoted intermediate its ends on the member 211. The movable member 212 is operable to cutting relation with the member 211 by the solenoid 118 against the bias of the spring 213.

The mechanisms described in the last few preceding paragraphs, i. e. the stationary gripper 90, the wire feeding and positioning means 280, the interference member or hook 206, and the cutter 210, as previously indicated, cooperate to supply wire to the wire wrapping tools. This procedure may be followed by considering the full line position of the arm 283 in Fig. 8 and the raised position of the feeding means 280 as an initial position. Consider further that the wire 60 has been cut by the cutter 210. The carriages 40 and 41 will be in the position shown in Fig. 5 at this time and the jaws of the stationary gripper 90 will be open due to the operation of the gripper solenoid 113. Operation of the solenoid 116 swings the positioning arm 283 to the dot-dash line position of Fig. 8 (see also Fig. 5). During this motion the end of the wire 60 projecting from the feed member 281 is bent by the forming hook 206, through which the wire is drawn. At the end of the travel of the arm 283, the end of the wire is inserted between the jaws of the gripper 90. The gripper solenoid 113 is then released allowing the jaws to grip the end of the wire 60. As the wiring tools A and B are moved to the left to the loading position of Fig. 1, the wire held by the gripper is payed out from the spool through the wire feeding means. The loading of the wiring tools will be included in a subsequent description of an illustrative operation of the wiring machine.

Figure 13:
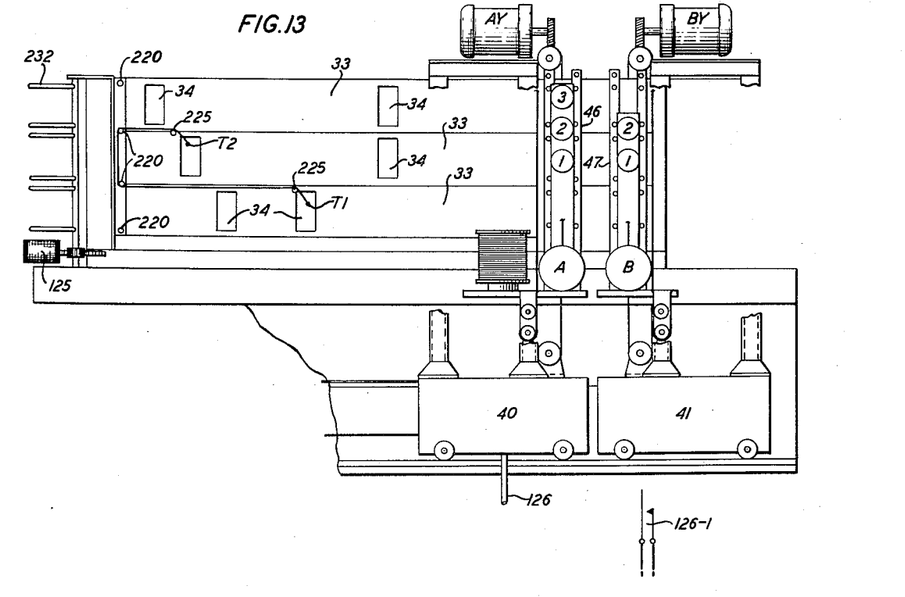
Fig. 13 is a schematic front elevational view of the wiring machine corresponding generally to Fig. 2.

A wiring machine of this type will connect wires by the shortest path between two selected terminals. For example, looking at Fig. 13, the wire may be run directly from the terminal T1 to the terminal T2. If the number of wires to be connected is small, this may be done; but wiring according to a coordinate pattern is often more advantageous. This may be done, as illustrated in Fig. 13, where a few apparatus units 34 are shown, by arranging the apparatus with horizontal wireways between the units. If a plurality of panels is used, as in the illustrative embodiment, these ways may be along the panel intersections and the upper and lower margins of the panel assembly. The vertical runs may all be made along the side margins of the panels, one case of which is shown in Fig. 13. In order to maintain such a wiring pattern it is necessary to constrain the wires at points of change of direction. This is done in the embodiment of the invention illustrated, by providing fixing pins or pegs 220 along the right and left panel margins and retractile pins 225 on the carriages 40 and 41 adjacent the wiring tools.

As shown in Figs. 2 and 3, the fixed pins 220 may be mounted on strips 221 secured to the ends of the panels. Where several panels are to be wired as a unit, the strips 221 serve to hold the panels together permanently. In accordance with the illustrative wiring pattern presently under discussion, the fixed pins 220 are located at each panel corner.

The retractile pins 225 that cooperate with the wiring tool A are secured to a pair of uprights 226 mounted on a block 227, which is reciprocable with respect to the carriage 40, as indicated by the arrows at 228a. The block 227 and thus the pins 225 are held in retracted position by the spring 228 and are moved to operating position by the solenoid AD via a member 229 projecting downwardly from the block 227. A similar arrangement of retractile pins 225 is associated with the wiring tool B and is operated by the solenoid BD.

Another way to constrain the wires at points of direction change, entails the use of a plurality of rows, say horizontal rows of retractile pins projectable through the panel or at panel margins between slightly spaced panels. These will take the place of the fixed and retractile pins previously described and would be operated by means similar to those used for the retractile pins 225. Various other pin arrangements may also be employed to meet particular wiring problems.

It is advantageous to have the connecting wires lie as close to the panel as possible. Toward this end, the wiring machine of this invention is equipped with a dressing comb or combs for pushing the wire down against the panel after it has been connected. In order to avoid the confusion in this illustration of one more mechanism at the right end of the assembly, only one dressing comb 230 at the left end has been shown.

Figure 4:
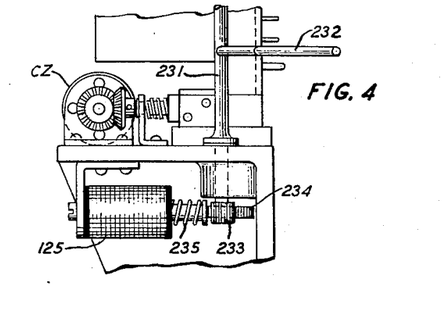
Fig. 4 is a fractional end view taken on the line 4—4 of Fig. 2.

As illustrated in Figs. 1, 2 and 4, the comb 230 comprises an upright shaft 231 journaled in the shelf 23 and provided with a plurality of spaced dressing teeth 232. A pinion 233 secured to the lower end of the shaft 231 is driven by a rack 234, which is operated by the solenoid 125 against the bias of the spring 235. In some cases where the wiring pattern allows the placing of all of the vertical runs of wire adjacent to the left end of the panel assembly, one dressing comb at this end will be sufficient. If two dressing combs are necessary, one may be provided at the right end also.

Figure 16:
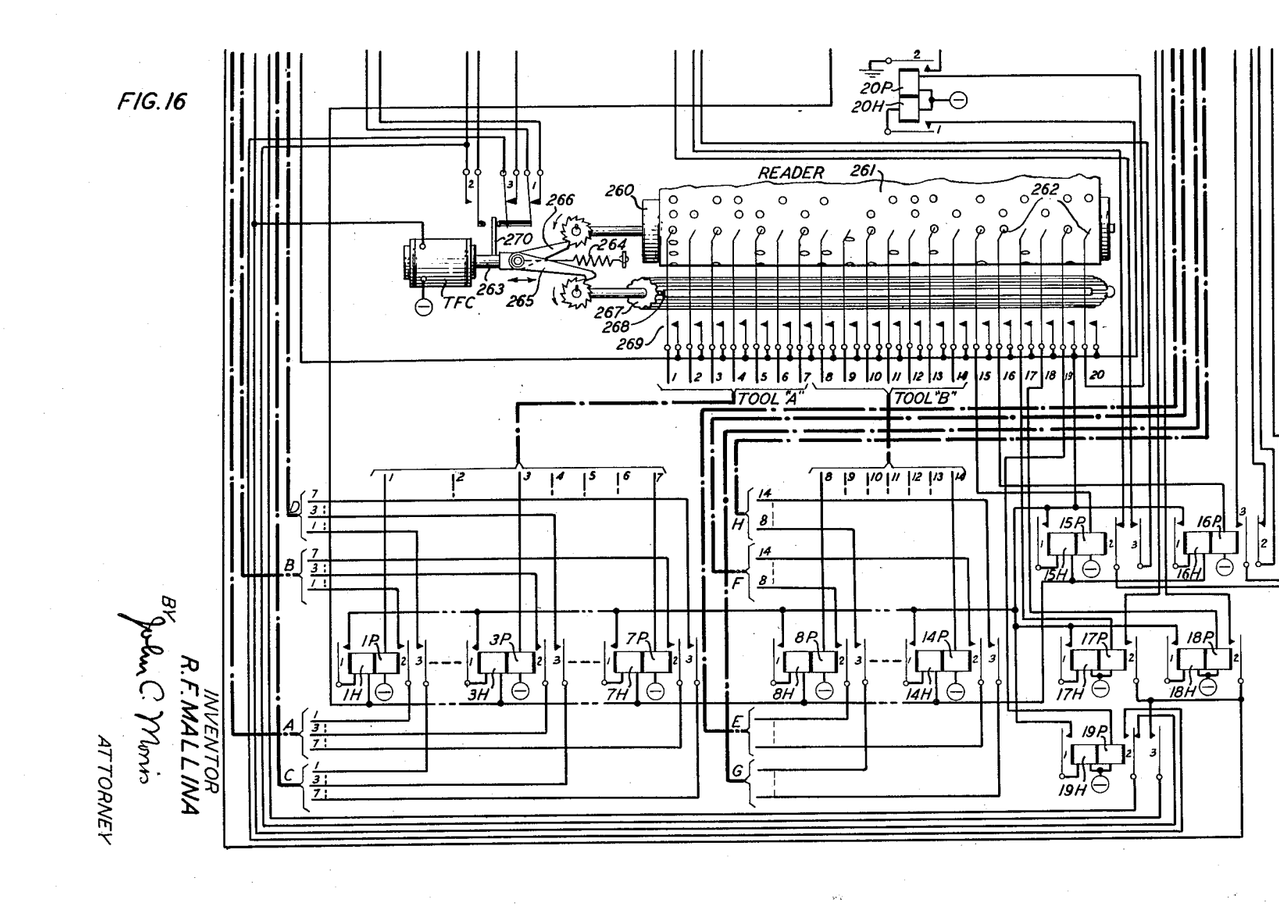

The motors and the solenoids for the various mechanisms so far described are controlled in the proper operational sequence to interconnect all necessary terminals in accordance with a wiring program or scheme. The program may be set up on some sort of a record that is electrically, optically, mechanically or otherwise readable by available means. Some examples of record means that may be used are: magnetized wire or tape, perforated cards, or a perforated tape. A perforated tape and a suitable reader similar to one used in automatic message accounting systems for handling telephone call information, has been selected for this illustrative embodiment. A reader of this type is described in an article entitled "The AMA Reader" published in the Bell Laboratories Record, volume XXX, chapter 6, June 1952, pages 237 to 243 inclusive. The operating means for the device herein disclosed has, for purposes of illustration, been somewhat simplified and adapted to the task at hand. The reader, Figs. 16 and 18, comprises a perforated roller 260 over which passes the record tape 261, which contains perforations in accordance with the wiring program to be followed. A plurality of reading fingers 262 is mounted adjacent the roller 260, there being a finger for each position across the tape at which information may be given. Twenty positions are used in this system, but any convenient number may be used.

Figures 17, 18:
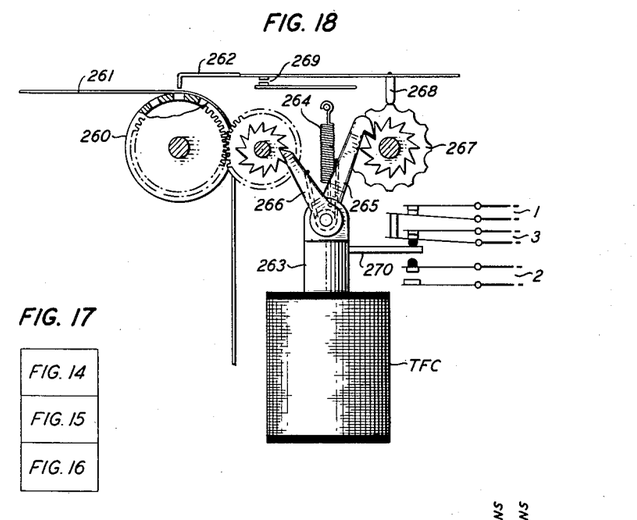
Fig. 18 is an end elevational view of a reader operating means.

The roller and the tape are operated by a stepping solenoid TFC through ratchet means. The core 263 of the solenoid TFC is biased to an extended position by a spring 264. A reader-finger operating pawl 265 and a tape-feed pawl 266 are pivoted on the core 263. The pawl 265 advances the lobed roller 267 one step when the solenoid TFC is energized, and the pawl 266 advances the tape roller 260 one step when the solenoid TFC is de-energized. During the advance of the lobed roller 267, the follower 268 drops momentarily into a depression between the lobes, allowing each reader finger 262 that is over a tape perforation, to close its associated contacts 269. The next lobe immediately raises the fingers, but the momentary closure of the contacts 269 has operated appropriate reader relays which are locked up, as will be explained.

Associated with the solenoid TFC are three pairs of contacts controlled by the projection 270 on the core 263. When the core 263 is extended, the contacts 1 and 3 are closed and the contacts 2 are opened, and vice versa, when the core is retracted. Functions of these contacts will appear in the circuit description.

Figure 19:
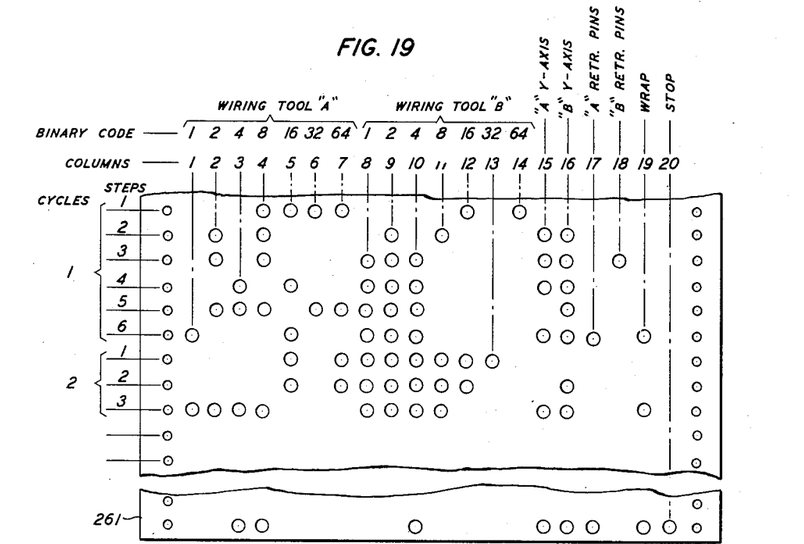
Fig. 19 is a representation of a portion of punched reader tape used for controlling the wiring machine of this invention.

As illustrated in Fig. 19, the twenty tape positions are divided into two groups of seven for wiring tool position designations with six additional positions for certain arbitrary commands. The groups of seven operate in accordance with a binary code having elements 1, 2, 4, 8, 16, 32 and 64, which allows the position of a wiring tool to be determined at any one of 127 positions along an axis. Positions 1 to 7 inclusive are assigned to the wiring tool A and positions 8 to 14 inclusive, to the wiring tool B. A perforation at the position 15 commands tool A to move vertically and the absence of a perforation at 15 commands the tool A to move horizontally. A perforation or its absence at position 16 does the same for the wiring tool B. The retractile pins 225 are controlled for tools A and B respectively by perforations at positions 17 and 18. The wiring tools are prepared for wire wrapping and returned to the home position by a signal or command from the tape position 19. The perforation at position 20 is for deactivating the system at the end of a wiring program.

The momentary closure of a reader contact 269 operates the corresponding reader relay which locks up and in turn determines some phase of a required operation. For example, a command for the wiring tool A to move to the position $x=69$, $y=1$ from some position say $x=40$, $y=1$ will come from reader contacts 1, 3 and 7 (the binary code is $1+4+64=69$). The corresponding reader relays will operate through their pickup coils 1P, 3P and 7P respectively and lock up through their hold coils 1H, 3H and 7H via their #1 contacts. Closure of the #2 contacts of these relays will prepare the AX motor network AXN to give a command voltage corresponding to a tool movement to the position $x=69$, and closure of the #3 contacts of the same relays will likewise prepare the network AYN of the AY motor. A command for horizontal ($x$) movement from reader position 15 (no perforation) by non-operation of the axis determining reader relay 15 determines that the AXN network is effective.

The servo-mechanism of each of these positioning motors includes the corresponding reader controlled network AXN, AYN, etc. and a motor operated potentiometer. The voltages from the network and from the potentiometer are fed into the appropriate summing amplifier AXA, AYA, etc. which controls the motor. The command or signal from the reader unbalances the system to drive the motor to the point required, at which point the potentiometer has rebalanced the system and the motor stops.

Figure 12:
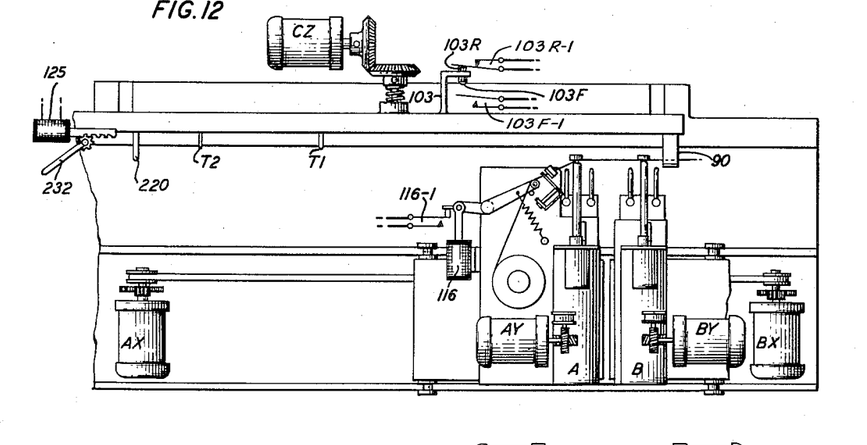
Fig. 12 is a schematic plan view of the wiring machine corresponding generally to Fig. 1.

As indicated in Fig. 12, the contacts 103F-1 and 103R-1 are operated respectively by the projections 103F and 103R on the arm 103 of the panel positioning means when in its extreme positions.

The home position of the wiring tools A and B is with the tools in their lowermost position and at the extreme right ($x=0$, $y=0$ in a coordinate system). In this position the pin 126 on the A tool carriage 40 closes the home contacts 126-1 (see Fig. 13).

In addition to the equipment so far described, this system includes various relays and contactors which will be noted as they appear in the circuit description.

The relays are direct current operated and are shown generally as connected between the negative terminal of the source BAT and ground. The indicator relays 120, 121, 122 and 123 for each amplifier, however, receive power from the amplifier which they accompany, e. g. 120 from AXA when said amplifier is operated, and are shown connected between each amplifier and ground.

Before the wiring machine is put into operation, the wire 60 from the spool 58 is threaded through the guide 208 between the one-way feed elements 231 and 232 under the forming hook 206 and up to the wire cutter 210 (see Figs. 6, 7, 8 and 9). Thereafter, the wire, having been cut near the end of each wiring cycle, will be in this position.

Figure 14:
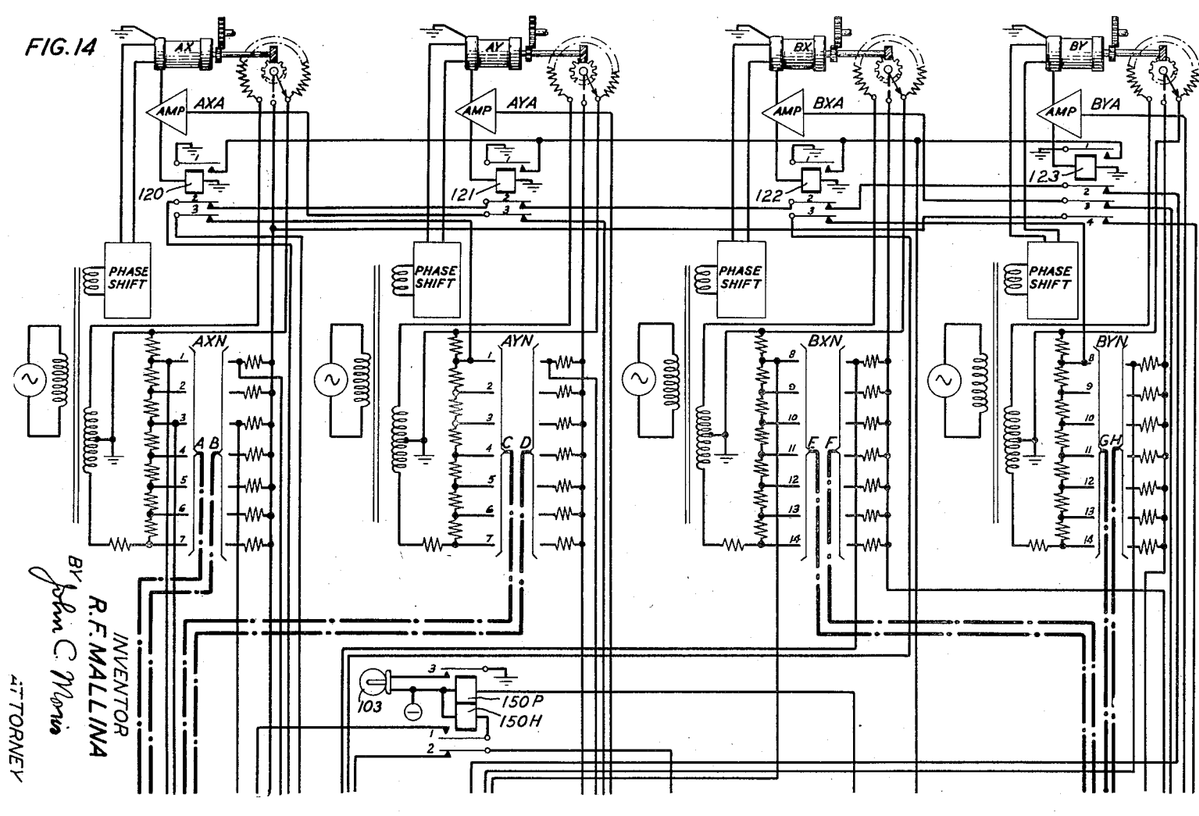
Figs. 14, 15 and 16 arranged as shown in Fig. 17 comprise a schematic circuit diagram of the wiring machine of this invention.

A sample operation in which terminal T1 at $x=80$, $y=7$ is connected to terminal T2 at $x=110$, $y=17$ (see Fig. 13) will serve to point out various details of operation. In the following description of operation, reference is made to Figs. 14, 15 and 16 arranged as shown in Fig. 17 with parenthetical reference to other figures, as required. The battery Bat (Fig. 15) for supplying operating current to the relays and solenoids is indicated as connected to the various operating circuits by the minus symbol and the symbol for a ground. Relay or solenoid contacts are related to the relays or solenoids to which they belong, by designations such as 146-2 for contact 2 of relay 146.

The operation of the machine is started with the wiring tools in the home position ($x=0$, $y=0$) for which position the home contacts 126-1 are closed by the pin 126 on the carriage 40 of tool A. Pressing of the starter key 100 closes its contacts 100-1 to energize the relay 146 via the home contacts 126-1 and the reset key contacts 102-2, which relay in turn operates the stationary gripper solenoid 113 (Figs. 10 and 11) via then closed back contacts 150-2, contacts 146-2 and then closed back contacts 147-2. Operation of the solenoid 113 opens the jaws of the stationary gripper 90. The contacts 113-1 closed by the opening of the gripper jaws, operate the feed member solenoid 116 to pivot the feed member 280 to place the end of the wire 60 in the gripper jaws (Fig. 5).

Operation of the relay 146 opens its contacts 146-1 to prevent operation of the relay 153 at this time. (The circuit for the operation or holding of the relay 153 is as follows: minus battery, through 153 and the chain including contacts 145–7, 146–1, 123–2, 122–2, 121–2, 120–2, TFC–1 in series and one of contacts 153–1, 152–1 or 146–4 which are in parallel and connected to the other side of the battery, i. e. to ground.)

Operation of the feed member 280 by the solenoid 116 closes the contacts 116–1, which energize the relay 147 through the then closed contacts 151–2. The contacts 147–1 provide a hold circuit for the feed member solenoid 116 keeping the feed member 200 extended and contacts 116–1 closed and thus hold the relay 147. The circuit of the stationary gripper solenoid 113 is broken by the opening of the contacts 147–2 allowing the gripper jaws to close and hold the wire 60. The start key 100 is released at this point.

Other contacts of the relay 147, upon its energization, furnish voltages for moving the wiring tool from the home position ($x=0$, $y=0$) to the loading position which may for purpose of illustration be $x=5$, $y=1$ for tool A and $x=1$, $y=1$ for tool B. The reader relay contacts 1–2 and 3–2 that would give the command 5 (code $1+4=5$) to the AX motor through the network AXN are shunted respectively by the contacts 147–3 and 147–5. The amplifier AXA is at this time connected to the network AXN via closed indicator relay contacts 121–3 and 123–4 and contacts 15–2 of the axis determining relay 15. The operation of the amplifier AXA energizes the relay 120 and opens the contacts 120–3, the purpose of which will appear presently. The motor AX starts moving the carriage 40 with the tool A to the left to the position $x=5$, $y=0$.

At the same time the closure of contact 147–8 shunts the reader relay contacts for the command 1 to the BX motor through the network BXN. The amplifier BXA and the network BXN are at this time interconnected through the closed indicator relay contacts 123–3 and the contacts 16–2 of the axis determining relay 16. The motor BX starts moving the carriage 41 with the wiring tool B to the left to the position $x=1$, $y=0$. The operation of the motor BX by its amplifier energizes the indicator relay 122 to open its contacts 122–3 for a purpose to be presently indicated.

Also upon operation of the relay 147, a command for vertical position 1 is prepared by the closed contacts 147–6. The contacts 147–7 connect the network AYN to the amplifier AYA of the motor AY, but the motor is not operated at this time due to a break in the vertical positioning circuit at the contacts 120–3, which as previously noted, occurs upon the operation of the AX motor.

Operation of the relay 147 also closes its contacts 147–9 and 147–10. The closure of 147–10 connects the amplifier BYA of the motor BY to the network BYN. The contacts 147–9 prepare the network BYN to give the vertical position signal 1, but this is not now effective because the circuit is presently open at indicating relay contacts 122–3 due to the operation of the motor BX.

When the tools A and B arrive at their designated horizontal positions $x=5$, $y=0$ and $x=1$, $y=0$, their operating circuits are balanced, so they stop. The relays 120 and 122 are de-energized closing their contacts 120–3 and 122–3 respectively to complete the previously prepared circuits for the motors AY and BY. The tools A and B are thus moved upward to their respective loading positions $x=5$, $y=1$, $x=1$, $y=1$.

As the shelf 287 (Fig. 9) rises with the tool A, downward bias of the spring 284 and the reaction of the camming member 289 hold the wire feed means 280 at its then level. The level of the wire 60 thus remains unchanged and the wrapping heads of the wiring tool come up to a position to grip the wire.

As long as any of the indicator relays 120 to 123 inclusive are energized, the slow release relay 152 is energized through a #1 contact of said indicator relays. The contacts 152–1 are in the previously noted chain of contacts that operate the relay 153 being in parallel with the contacts 153–1 and 146–4 and in series with the remainder of the chain. Two contact pairs in the series portion of this chain, i. e. contacts 146–1 of the starting relay 146 and TFC–1 of the tape feed solenoid, are usually closed, being opened only during the time of starting or of tape feeding. Thus when all of the indicator relays 120 to 123 inclusive are de-energized, the chain for the relay 153 is completed through the #2 contacts of these indicator relays. Although de-energization of all of the indicator relays de-energizes the relay 152 of this chain, its slow release permits energization of the relay 153, which then locks up through its contacts 153–1 before the contacts 152–1 open.

When the wiring tools reach the loading position at the end of their vertical travel, the relays 121 and 123 are de-energized closing their contacts 121–2 and 123–2 to operate the relay 153. The relay 153 performs several functions at this time.

The closing of contacts 153–2 operates the relay 148 through its pickup coil 148P and the then closed back contacts 19–2 of the wrapping tool control relay 19 and the contacts 145–2 of the relay 145. The relay 148 is held in energized condition by its hold coil 148H through its contact 148–1 and the then closed back contact 143–5 of the relay 143.

The closure of the contacts 148–2 operates the sleeve controlling solenoid A3 of the tool A to loosely grip the wire 60, and the sleeve controlling solenoid B1 of the tool B to tightly grip the wire 60 and to crush its insulation. The circuit is from minus battery through the solenoid A3 and B1 in parallel, contacts 148–2 and the then closed back contacts 145–2 to ground.

The tape feed solenoid TFC, which is in parallel with the pickup coil 148P is also operated by closure of the contacts 153–2 via back contacts 19–2 and 145–2. Operation of TFC causes the reader fingers 262 to read the first line of the tape and thus operate the appropriate reader relays. It may be here noted that the circuits of all of the reader relays 1 to 20 inclusive both pickup and holding are through the back contact 145–3 of the home relay 145. The operation of TFC also opens contacts TFC–1 and TFC–3 and then closes contacts TFC–2.

The opening of the contacts TFC–1 releases the relay 153 by breaking its operating contact chain at this point. The closing of the contacts TFC–2 energizes the relay 151 via now closed back contacts 153–3 and 145–2. The circuit is from minus battery through 151, TFC–2, 153–3 and 145–2 to ground. The relay 151 holds through its contacts 151–1 by substituting these contacts for the contacts TFC–2. The closing of the contacts 151–5 energizes the stationary gripper solenoid 113 to open the gripper jaws to release the end of the wire 60. The circuit is from minus battery through relay 113, back contacts 150–2, contacts 151–5 to ground.

The relay 147, which has been held by the circuit from minus battery through 147, back contacts 151–2, feed member contact 116–1 to ground, is de-energized by the opening of the contacts 151–2. The feed member solenoid 116, which has been held through the contacts 147–1, is thereby released allowing the feed member 280 to swing to its normal position (the full line position of Fig. 8) under the influence of the spring 284. The wire 60 tilts the forming hook 206 against the bias of the spring 207 and enters the notch of said hook. The closing of the contacts 151–3 completes the circuit for the hold coils of the reader relays 1 to 16 inclusive.

It may be here noted that the travel of the core of the solenoid TFC is relatively slow as compared with relay operation, furthermore, the spacing of the TFC contacts is such as to open TFC–1 to de-energize the relay 153 sufficiently ahead of the closure of the contacts TFC–2 to close the back contact 153–3 in time for it to partake of the energization of the relay 151–1. Also the contacts TFC–2 are located at a point in the travel of the core such that the relay 151 will be energized while the reader fingers 262 are in the reading position with contacts 269 closed. This is so that the contacts 151–3 will complete the circuit for the reader relay hold coils while the pickup coils are still energized.

When the reader fingers 262 read the first line of the perforated tape (step 1 as illustrated in Fig. 19), the reader relays for the tape positions 4, 5, 6, 7, 12 and 14 are operated by their pickup coils 4P, 5P, etc. and held by their hold coils 4H, 5H, etc. through their #1 contacts and the contact 151–3. As indicated in Fig. 19, the fingers 1 to 7 inclusive control the A tool and the fingers 8 to 14 inclusive control the B tool.

Since this code line or step contains no perforation at the position 15, the reader relay 15 remains unoperated with its contacts 15–3 open. The amplifier AXA for the motor AX is thus connected to the network AXN via the contacts 121–3, 15–2 and 123–4, and the circuit between the amplifier AYA and its network AYN remains open at the contacts 15–3. The command for the AX motor from the reader fingers 4, 5, 6 and 7 is 120 (binary code 8+16+32+64=120) to move the tool A to the position $x=120$, $y=1$.

The command 80 for the BX tool is given by the reader fingers at the positions 12 and 14 (binary code 16+64=80). Since there is no perforation at the position 16, the command is for the $x$ or horizontal direction and goes to the BX motor and its network BXN. As in the case of the A positioning motor the non-operation of the relay 16 leaves contact 16–2 closed and 16–3 open thereby connecting BX to BXN and leaving BY and BYN unconnected.

When the tools A and B reach their respective horizontal positions, the systems are balanced, the motors stop and the indicator relays 120 and 122 are de-energized. A consequent closure of the contacts 120–2 and 122–2 completes the contact chain for the energization of the relay 153. Opening of the contacts 153–3 releases the relay 151 to open its contacts 151–3 and release the reader relays.

Energization of the relay 153 closes its contacts 153–2 to energize the tape feed solenoid TFC. Since the relay 148 is at this time energized, energization of its pickup coil 148P in parallel with the solenoid TFC is of no effect.

Energization of the tape feed solenoid TFC causes the second line of the record tape to be read. The readings are by the fingers in the positions 2 and 4 in the A group for the command 10 and by the fingers in positions 9 and 11 in the B group, also for the command 10. Perforations at both positions 15 and 16 indicate the $y$ or vertical direction for each tool. The operation of the relay 15 opens its contacts 15–2 and closes its contacts 15–3 thereby enabling the AY motor and disenabling the AX motor. The corresponding contacts of the operated relay 16 direct the command to the BY motor. The tools A and B are moved vertically to their command positions, where they stop and the relay 153 operates to start the next step of the operation.

Before considering the next step of operation, it may be of interest here to note that the tool B now in the position $x=80$, $y=10$ has its wiring head in the correct horizontal or $x$ position for the terminal T1 and three coordinate system units above this terminal. The tool A has its wiring head just to the left of and below the left-hand dressing pin 220 at the margins of the bottom and middle panel sections 33. The wire 60, gripped in the jaws of the tool B and slidable through the jaws of the tool A, is strung under tension due to the wire feed mechanism 200, between the positions $x=120$, $y=10$ and $x=80$, $y=10$.

The next line (step 3 of Fig. 19) gives the same command for tool A as was given for step 2 so that the tool A does not move. The command for the tool B is to go in the vertical direction $y$ down to position 7 (code 1+2+4=7), the hole at position 16 being punched to indicate vertical movement for tool B. An additional command from the tape position 18 projects the retractile dressing pins 225 (Figs. 3 and 13) into the wiring plane, the one shown in Fig. 13 adjacent the terminal T1 being the only one of interest at the moment. The retractile pins 225 used in the operations being described have, for convenience of illustration, been shown in Fig. 13 in the positions they would occupy when the tools B and A were respectively at the positions for operating on the terminals T1 and T2. These pins are, as previously described, on the carriages 40 and 41 and project toward the panel. The pins 225 for the tool B are projected by the solenoid BD, which is structurally like the corresponding A tool dressing pin solenoid AD of Fig. 3. The circuit is from minus battery through the solenoid BD, contacts 18–2 and the then closed back contact 145–2 to ground. It will be noted that the circuit of the reader relay 18 does not go through the contacts 151–3 so that the relay 18 remains locked up through its contact 18–1 and hold coil 18H for the remainder of the cycle. This keeps the retractile pins 225 projected during this same period. The pin 225 of interest here is at this time just to the left of the wiring head of the tool B and below the wire 60. When the tool B moves downward to the position $x=80$, $y=7$, the wire 60 is dressed around the noted pin 225.

The next command (step 4, Fig. 19) leaves the B tool in place and moves the A tool upwardly to the position $x=120$, $y=20$. The wire 60 is dressed around the fixed dressing pin 220 at the point of change in direction from horizontal to vertical.

The command for step 5, Fig. 19, again leaves the B tool in place and moves the A tool to the right to the position $x=110$, $y=20$. The wire 60 is this time dressed around another fixed dressing pin 220 in changing from vertical to horizontal direction. The wiring head of the tool A is now directly above the terminal T2 to which it is to make a connection and must next be moved down three coordinate system units to the position $x=110$, $y=17$ of said terminal T2.

The last line (step 6, Fig. 19) of this cycle is to move the tool A to this terminal T2, to project the retractile dressing pins for the tool A to operative position, and to direct the performing of all the remaining operations of the cycle. The tool position commands for step 6, Fig. 19, leave the B tool in its last position at terminal T1 and give the command 17 to move the tool A down to $x=110$, $y=17$, i. e. to the terminal T2.

A command from the tape position 17, Fig. 19, operates the relay 17 via its pickup coil 17P. The relay 17 locks up through its hold coil 17H and its contacts 17–1. Closure of the contacts 17–2 operates with solenoid AD to project the A tool dressing pins 225.

A command from the position 19 of Fig. 19 operates the relay 19 via its pickup coil 19P. The relay 19 locks up through its hold coil 19H and its contacts 19–1. It will be remembered that at the end of each step, the relay 153 is energized to, among other things, energize the tape feed solenoid TFC via contacts 153–2 and the then closed back contacts 19–2, and that the reading of the tape occurs during the movement of the core of solenoid TFC. This occurs at the end of step 5 to set up the reading for step 6, however, for this last step the command via the relay 19 transfers the contacts 19–2 from the circuit of TFC to several circuits including the wire cutting solenoid 118, the relays ZR and ZF of the panel positioning motor CZ and the A tool sleeve controlling solenoid AL. These circuits are through the back contact TFC–3, so will remain inoperative while TFC is operated.

While the tool A is moving down to the terminal T2, it dresses the wire 60 around the then projected retractile pin 225 of the A tool. When the tool A reaches its final position at terminal T2, the relay 153 is energized. Closure of the contacts 153–2 this time, due to the transfer at contacts 19–2, operates the cutter solenoid 118 to cut the end of the wire 60 that projects from the wiring head of the tool A. This circuit is from minus battery through 118, TFC-3, front contact 19-2, contact 153-2 and the then closed back contact 145-2 to ground. The sleeve operating solenoid A1 and the relay ZF of the panel positioning motor CZ are also operated by the contact 153-2 via the circuit: minus battery through A1 and ZF in parallel, now closed back contacts 143-2 of the relay 143, contacts TFC-3, front contacts 19-2, contacts 153-2 and the then closed back contacts 145-2 to ground.

The solenoid A1 moves its sleeve to close the wiring head jaws of the tool A to crush the insulation on this end of the wire 60. The relay ZF closes its contacts ZF-1 and ZF-2 to energize the motor CZ to move the panel into the wiring plane, which inserts the terminals T1 and T2 into the respective wiring heads of the tools B and A. Near the end of its forward travel the panel supporting frame closes the contacts 103F-1, which energize the relay 143. The front contacts 143-1 hold the relay 143 via the back contacts 145-2. Opening of the back contacts 143-2 deenergizes the relay ZF, stopping the motor CZ, and releases the insulation crushing grip of the solenoid A1.

Closure of the contacts 143-4 energizes the sleeve operating solenoids A2 and B2 to hold the wire in each tool with a grip suitable for wire wrapping and insulation stripping.

Opening of the back contacts 143-5 de-energizes the relay 148 which by the resultant opening of the contacts 148-2 releases the solenoids A3 and B1 which have respectively been containing the wire loosely in the tool A and gripping its initial end in the tool B.

Closing of the contacts 143-4 also energizes the relay W which controls the wiring wrapping motors of both of the tools A and B through their control solenoids WA and WB to wrap their respective connections.

The contacts 143-6 in the operating circuit of the relay 145 are closed by the energization of the relay 143 but are of no present effect due to the opening at the contacts 103R-1 on the panel positioning frame.

Closing of the contacts 143-3 energizes the relay 144 which is slow operating to give time for the wire wrapping to be completed before closing its contacts 144-1 to energize the relay ZR. The relay ZR when energized operates the panel frame motor CZ to move the panel rearwardly out of the wiring plane.

The panel frame near the end of its rearward travel, closes the contacts 103R-1 energizing the relay 145, which holds through its contacts 145-1. The circuit is from minus battery through 145, 143-6, 103R-1 and now closed back contacts 147-7 to ground. The operation of the relay 145 performs several functions:

Opening of the back contacts 145-2 releases the sleeve solenoids A2 and B2, the motor control relay W, and thus the wrapping tool solenoids WA and WB, the retractile dressing pin solenoids AD and BD, and the relays 143, 144 and 151.

Opening of the back contacts 145-3 releases all of the reader relays preparing this part of the system for a new operating cycle.

Closing of the contacts 145-4 prepares an operating circuit for the relay 146 which circuit will be presently described.

Closing of the contacts 145-5 and 145-6 respectively shunt the contacts 147-7 and 15-3 of the AY motor control system; and the contacts 147-10 and 16-3 of the BY motor control system to interconnect the amplifiers and the networks of these motors for the homing travel of the wiring tool. This is necessary because the relays 147, 15 and 16 are all de-energized at this time.

Opening of the back contacts 145-7 prevents the operation of the relay 153 along with the relay 146 when 146 is operated in a manner presently to be described over a contact chain partially common to both of these relays.

The back contacts 145-8, which are in parallel with the contacts 123-4 of the BY motor indicator relay 123, are opened to allow the 123-4 contacts to stop the A tool in case it reaches $y=0$ before the B tool arrives at $y=0$.

At this time the condition of all of the relays is such that the voltages in the motor control networks are all zero. The tools, therefore, will be conditioned to start for the home position $x=0$, $y=0$. Conditioning of the motor circuits for starting will operate all of the indicator relays 120 to 123 inclusive. The opening of the contacts 121-3 of the AY motor indicator relay disenables the motor AX by disconnecting the network AXN therefrom. The opening of the contacts 123-3 of the BY motor indicator relay disenables the motor BX by disconnecting the network BXN therefrom.

Since the indicator relays of the AX and BX motors have no contacts to disenable the AY and BY motors, the vertical motors take over and move the tools down to the $y=0$ level. The opening of the contacts 123-4 of the BY motor's indicator relay makes an additional gap in the control circuit of the motor AX for the purpose, as previously noted, of preventing horizontal motion of the A tool, in the event that it arrives at $y=0$ first, until the B tool has also come down to $y=0$.

When both tools are at the $y=0$ level the AX and BX motors operate to return the tools to the home position. The carriage 40 of the A tool upon arrival closes the home contact 126-1.

During the positioning motor operations, one or more of the contacts 120-1, 121-1, 122-1 and 123-1 have been closed to operate the relay 152. When the last motor operation of this step is completed, the relay 152 is de-energized, but releases slowly enough to allow completion of the contact chain 152-1, TFC-1, 122 121-2, 122-2, 123-2, 145-4, 126-1 (home contact) to energize the relay 146. The relay 146 holds through its contacts 146-4 which is in parallel with the contacts 152-1.

The closing of the contacts 146-3 energizes the dressing solenoid 125 to cause the teeth 232 to dress the wire down against the panel.

The closing of the contacts 146-2 opens the jaws of the stationary gripper 90 by energizing its solenoid 113 to start the next cycle via the circuit minus battery through 113, now closed back contacts 150-2, contact 146-2 and now closed back contact 147-2 to ground. The loading of the tools is as for the first cycle. When this preparatory part of the cycle is completed, the relay 153 is operated, closing its contacts 153-2 to operate the tape feed solenoid TFC. The first line of the next cycle is read and from here on the operation is in accordance with the commands of this next cycle.

When the reader comes to the last step of the last cycle of operation for a given wiring scheme, a perforation at the position 20 operates the relay 20 through its pickup coil 20P. The contacts 20-1 close and lock up this relay through the circuit: minus battery, coil 20H, contacts 20-1 and contacts 145-3 to ground.

The closing of the contacts 20-2 operates the relay 150 through its pickup coil 150P. The relay 150 holds through its hold coil 150H via contact 150-1 and normally closed contacts 102-1 of the reset key 102.

The opening of the back contacts 150-2 opens the circuit of the stationary gripper solenoid 113 to prevent the starting of a new cycle. The closing of the contacts 150-3 lights a signal lamp 103 to notify an attendant that the wiring has been completed.

When the relay 146 operates, the closing of its contacts 146-2 will not start a new cycle because of the noted break in the circuit of the solenoid 113.

When the reset button 102 is pressed, the relay 146 is first de-energized by the opening of the contacts 102-2 and then the relay 150 is de-energized restoring the break in the circuit of the solenoid 113 by the closure of the back contacts 150-2. This leaves the system ready for starting by the starting key 100.

The home position of the wiring tools has been indicated occasionally in this specification as the coordinate position $x=0$, $y=0$. Obviously, due to the horizontal spacing between the wiring tools, the $x$ coordinate of both tools cannot be zero at the same time. If A is at $x=0$, B must be somewhat to the right of this position or if B is at $x=0$, A will be to the left of this position. This horizontal difference is taken care of in the position control circuits so that each tool will be directed to the correct coordinate position.

What is claimed is:

1. An automatic wiring apparatus for simultaneously applying and securing the opposite ends of a wire to spaced terminals on a panel comprising a movable frame suitable for supporting the panel, motor means for said movable frame, a pair of carriages spaced from and operable for horizontal movement across said movable frame, separate motor means for said carriages, elevators supported on said carriages and operable for vertical movement across said movable frame, said elevators being individual to each of said carriages, motor means for each of said elevators, wiring devices supported on said elevators and individually operable to apply and secure the opposite ends of a wire to spaced terminals, motor means in said wiring devices, means for supplying a wire simultaneously to both of said wiring devices, means for causing one wiring device to grip an end of the wire, and means for causing the other wiring device to make guiding connection with a portion of said wire; and control apparatus for said motor means operable to control the operations of said motor means in accordance with a predetermined wiring program.

2. A wiring machine for interconnecting selected terminals of an array of panel mounted terminals in accordance with a wiring program, that comprises two wiring tools each including a wire wrapping head for handling wire and for connecting wire to terminals, a plurality of electromagnetic means for each tool operable selectively for conditioning the wiring heads to perform wire handling and wire wrapping operations, motor means for each tool, a vertically movable elevator for each tool, a motor for each elevator, a horizontally movable carriage for each elevator, a motor for each carriage, said carriages and elevators being constrained to move the wrapping heads of said tools in a wiring plane, means on one of said elevators for supplying wire to said tools, including wire controlling means and wire cutting means, electromagnetic means for operating each of the wire controlling and the wire cutting means, a base including means for supporting said carriages, a panel supporting means on said base, means including motor means for reciprocating the panel to move the terminals to and from the wiring plane, wire gripping means on the panel supporting means and including an electromagnetic means for cooperating with the wire controlling means on said one elevator to supply different portions of a wire to the tools, wire guiding means including spaced pins fixed on said panel and spaced retractile pins on said elevators, said retractile pins movable to and from the wiring plane, electromagnetic means for moving the retractile pins, a wire dressing comb pivoted to said panel supporting means, electromagnetic means for operating said comb, a wiring program record means, means for reading said record means, electromagnetic means for operating the reading means and for controlling the record means; and an electrical network means including relays for controlling all of the said motor means and of the said electromagnetic means to follow the wiring program of said record means.

3. A wiring machine for interconnecting selected terminals of an array of panel mounted terminals in accordance with a wiring program, that comprises two wiring tools including respectively enantiomorphically related wire wrapping heads for handling wire and for connecting wire to terminals, a plurality of electromagnetic means for each tool operable selectively for conditioning the wiring heads to perform wire handling and wire wrapping operations, motor means for each tool, a vertically movable elevator for each tool, a motor for each elevator, a horizontally movable carriage for each elevator, a motor for each carriage, said carriages and elevators being constrained to move the wrapping heads of said tools in a wiring plane, means on one of said elevators for supplying a wire simultaneously to said tools including wire controlling means, electromagnetic means for operating the wire controlling means, a base including means for supporting said carriages, a panel supporting means on said base, means including motor means for reciprocating the panel to move the terminals to and from the wiring plane, wire gripping means on the panel supporting means and including an electromagnetic means for cooperating with the wire controlling means on said one elevator to supply wire to the tools, wire guiding means including spaced pins fixed on said panel and spaced retractile pins on said elevators, said retractile pins movable to and from the wiring plane, electromagnetic means for moving the retractile pins, a wire dressing comb pivoted to said panel supporting means, electromagnetic means for operating said comb, a wiring program record means, means for reading said record means, electromagnetic means for operating the reading means and for controlling the record means; and an electrical network means for controlling all of the said motor means and of the said electromagnetic means to follow the wiring program of said record means.

4. A wiring machine for interconnecting selected terminals of an array of panel mounted terminals in accordance with a wiring program, that comprises two wiring tools each including a wire wrapping head for handling wire and for connecting wire to terminals, a plurality of electromagnetic means for each tool operable selectively for conditioning the wiring head to perform wire handling and wire wrapping operations, motor means for each tool, a vertically movable elevator for each tool, a motor for each elevator, a horizontally movable carriage for each elevator, a motor for each carriage, said carriages and elevators being constrained to move the wrapping heads of said tools in a wiring plane, means on one of said elevators for simultaneously supplying a wire to said tools including electromagnetic operating means, a base including means for supporting said carriages, a panel supporting means on said base, means including motor means for moving the panel to position the terminals in or out of the wiring plane, means on the panel supporting means and including an electromagnetic means for operating with the means on said one elevator for supplying wires to grip the wire while said wire is being supplied to the tools, wire guiding means including spaced pins fixed on said panel and spaced retractile pins on said elevators, said retractile pins movable to and from the wiring plane, electromagnetic means for moving the retractile pins, a wire dressing comb pivoted to said panel supporting means, electromagnetic means for operating said comb, a wiring program record, means for reading said record, electromagnetic means for operating the reading means and for controlling the record; and an electrical network including relays for controlling all of the said motor means and the said electromagnetic means to follow the wiring program of said record.

5. A wiring machine for interconnecting terminals in accordance with a wiring program, that comprises two wiring tools each including means for connecting wire to terminals, motor means for each tool, a vertically movable means supporting each tool, each including a motor, a horizontally movable means supporting each vertically movable means each including a motor, means for supplying a wire to said tools, a base including means for supporting said horizontally movable means, means including motor means to move the terminals into wiring position, wire guiding and dressing means, a wiring program record means, means for reading said record means, means for operating the reading means and for controlling the record means; and means for controlling all of the said means to follow the wiring program of said record means.

6. A wiring machine for interconnecting selected terminals of an array of panel mounted terminals in accordance with a wiring program, that comprises two wiring tools each including means for handling wire and for connecting said wire to terminals, a plurality of means for each tool operable selectively for conditioning the tool to perform wire handling and wire wrapping operations, motor means for each tool, vertical translating means for each tool, including a motor, a horizontal translating means for each tool, including a motor, said translating means being constrained to move said tools parallel to a wiring plane, means on one of said vertical translating means for simultaneously supplying a wire to said tools including wire controlling means and wire cutting means, means for operating each of the wire controlling and the wire cutting means, a base including means for supporting said translating means, a panel supporting means on said base, means including motor means for reciprocating the panel to move the terminals to and from the wiring plane, means on the panel supporting means for operating with the wire controlling means on said one vertical translating means to supply wire to the tools, wire guiding means on said panel supporting means and on said vertical translating means, wire dressing means on said panel supporting means, means for operating said dressing means, a wiring program record means, means for reading said record means, means for operating the reading means and for controlling the record means; and means for controlling all of the said motor means and the said operating means to follow the wiring program of said record means.

7. A wiring machine for interconnecting selected terminals of an array of terminals in accordance with a wiring program, that comprises two wiring tools for handling wire and for connecting said wire to terminals, motor means for each tool, a vertically movable elevator for each tool, a motor for each elevator, a horizontally movable carriage for each elevator, a motor for each carriage, said carriages and elevators being constrained to move said tools parallel to a wiring plane, means on one of said elevators for supplying a wire to said tools including wire controlling means and wire cutting means, electromagnetic means for operating each of the wire controlling and the wire cutting means, a base including means for supporting said carriages, a terminal supporting means on said base, means including motor means to move the terminals to and from the wiring plane, means on the terminal supporting means and including an electromagnetic means for operating with the wire controlling means on said one elevator to supply wire to the tools, wire guiding means including spaced pins fixed on said panel and spaced retractile pins on said elevators, said retractile pins movable to and from the wiring plane, electromagnetic means for moving the retractile pins, a wire dressing comb pivoted to said panel, electromagnetic means for operating said comb, a wiring program record means, means for reading said record means, electromagnetic means for operating the reading means and for controlling the record means; and an electrical network means including relays for controlling all of the said motor means and of the said electromagnetic means to follow the wiring program of said record means.

8. In a wiring machine for interconnecting selected terminals of an array of terminals that comprises wire connecting tools and means for positioning said tools at the selected terminals, and means for bringing the terminals and the tools into wire connecting relation; means for supplying a wire to both wire connecting tools comprising wire storage means, wire positioning and feeding means, wire forming means, and wire cutting means all mounted adjacent to and positionable with one of the wire connecting tools; a wire gripping means mounted in a fixed position on the wiring machine, said wire positioning and feeding means including an arm swingable toward said wire gripping means, said arm having a wire retaining means at its end, said wire forming means comprising a hook adjacent the wire retaining means cooperative therewith to bend a wire at the retaining means when the arm swings toward the gripping means; and driving means associated respectively with the tool positioning means, the wire positioning and feeding means, the wire cutting means, and the wire gripping means to position the tools, to cut the wire, to form said wire and to position an end thereof in the gripper to load the wire into the wire connecting tools and to release it to said tools.

References Cited in the file of this patent

UNITED STATES PATENTS

| | | |
|---|---|---|
| 1,823,680 | Curtiss | Sept. 15, 1931 |
| 2,029,335 | Oberhoffken | Feb. 4, 1936 |
| 2,082,388 | Getz | June 1, 1937 |
| 2,438,098 | Tandler | Mar. 6, 1948 |
| 2,537,770 | Livingston | Jan. 9, 1951 |
| 2,551,358 | Andren | May 1, 1951 |
| 2,637,096 | Luhn | May 5, 1953 |
| 2,649,121 | Reck | Aug. 18, 1953 |
| 2,736,852 | Nelson | Feb. 28, 1956 |